(12) United States Patent
Armitage

(10) Patent No.: US 7,650,424 B2
(45) Date of Patent: Jan. 19, 2010

(54) SUPPORTING MOBILE HOSTS ON AN INTERNET PROTOCOL NETWORK

(75) Inventor: Grenville J. Armitage, Redwood City, CA (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 2170 days.

(21) Appl. No.: 09/824,960

(22) Filed: Apr. 3, 2001

(65) Prior Publication Data
US 2002/0026525 A1 Feb. 28, 2002

Related U.S. Application Data

(60) Provisional application No. 60/194,387, filed on Apr. 4, 2000.

(51) Int. Cl.
G06F 15/173 (2006.01)

(52) U.S. Cl. .................. 709/238; 709/231; 709/225; 455/436

(58) Field of Classification Search .......... 709/230–232, 709/238, 245, 249, 225; 370/390, 392, 400, 370/401, 312; 455/436
See application file for complete search history.

(56) References Cited

U.S. PATENT DOCUMENTS

| | | | | |
|---|---|---|---|---|
| 5,778,187 A * | 7/1998 | Monteiro et al. | ............ | 709/231 |
| 5,930,259 A * | 7/1999 | Katsube et al. | ............ | 370/409 |
| 6,131,120 A * | 10/2000 | Reid | .......................... | 709/225 |
| 6,147,986 A | 11/2000 | Orsic | | |
| 6,181,697 B1 * | 1/2001 | Nurenberg et al. | .......... | 370/390 |
| 6,189,039 B1 * | 2/2001 | Harvey et al. | ............... | 709/232 |
| 6,243,758 B1 * | 6/2001 | Okanoue | .................... | 709/238 |
| 6,577,609 B2 * | 6/2003 | Sharony | .................... | 370/312 |
| 6,611,510 B2 * | 8/2003 | Famolari et al. | ............ | 370/335 |
| 6,611,872 B1 * | 8/2003 | McCanne | .................... | 709/238 |
| 6,640,251 B1 * | 10/2003 | Wiget et al. | .................. | 709/238 |
| 6,654,792 B1 * | 11/2003 | Verma et al. | ................. | 709/208 |
| 6,701,437 B1 * | 3/2004 | Hoke et al. | .................. | 713/201 |
| 2001/0036834 A1 * | 11/2001 | Das et al. | ..................... | 455/458 |

OTHER PUBLICATIONS

Perkins, ed., RFC 2002, http://www.ietf.org/rfc/rfc2002.txt?number=2002, Oct. 1996.*

J. P. Mysore, et al., "Performance of Transport Protocols over a Multicasting-based Architecture for Internet Host Mobility", Int'l Conf. on Communications (1998).

(Continued)

*Primary Examiner*—Jungwon Chang
(74) *Attorney, Agent, or Firm*—The Capitol Patent & Trademark Law Firm, PLLC

(57) ABSTRACT

A subnet of an information network includes one or more mobile hosts, and a first interface of a home router. The first interface and the mobile hosts are assigned corresponding group addresses. Unicast addresses of packets received at a second interface of the home router and destined to members of the subnet, are mapped to the member's group addresses. Each mobile host sends a request to join a group corresponding to the group address assigned to the host, whenever the host links with the network at a new point of attachment. Thus, network routers can track the host as it moves its link with the network from one point of attachment to another, and unicast packets destined to the mobile host from a host outside the subnet are routed to the mobile host over the virtual link created between the home router and the mobile host.

14 Claims, 3 Drawing Sheets

U1.x GLOBAL IP ADDRESSES OF MOBILE INTERFACES ON VIRTUAL SUBNET U1
Mx   GROUP ADDRESS ASSIGNED TO VIRTUAL INTERFACE OF U1.x
Lx   'REAL' IP ADDRESS ASSIGNED TO VIRTUAL INTERFACE OF U1.x

OTHER PUBLICATIONS

J. P. Mysore, et al., "A New Multicasting-based Architecture for Internet Host Mobility", MOBICOM(1997).

S. Seshan, et al., "Handoffs in Cellular Wireless Networks: The Daedalus Implementation and Experience".

* cited by examiner

SUPPORTING MOBILE HOSTS ON AN INTERNET PROTOCOL NETWORK

CROSS REFERENCE TO RELATED APPLICATION

This application claims the priority under 35 U.S.C. § 119(e) of U.S. Provisional Application 60/194,387, filed Apr. 4, 2000, and entitled "Multicast Mobility for IP Nodes".

BACKGROUND OF THE INVENTION

1. Field of the Invention

This invention relates to a technique that enables a mobile node or host to communicate with other nodes associated with a wired information network, notwithstanding changes in the mobile host's point of attachment to the network.

2. Discussion of the Known Art

As devices that operate over the global Internet are now of such size as to be easily carried (or even worn) by a person, it becomes more important to consider Internet Protocol (IP) communications involving hosts that are geographically mobile. A known approach to IP mobility solves the problem of delivering IP packets to mobile hosts by assigning one unique IP address for each host, and allowing a home agent or "proxy" located at the site of the IP address to forward the packets to the mobile host while the latter continuously informs the agent of its present location.

Another approach is to re-define the address of the mobile host each time the host changes its point of attachment with the network. For example, U.S. Pat. No. 6,147,986 (Nov. 14, 2000) which is assigned to the assignee of the present application and invention, discloses a method of defining an address for a mobile terminal host when the latter links with a wired network such as the global Internet. When the host links with the network via a first base station, the host is assigned an address that corresponds in part to an address of the first base station. When the host changes position and links with a second base station, the host address is changed to one that corresponds in part to the second base station's address. At least one stationary host in the network is informed of a current address assigned to the mobile host, by establishing a connection with the mobile host. See also U.S. Pat. No. 5,652,751 (Jul. 29, 1997), which discloses message routing schemes for wireless mobile networks having dynamically changing topologies.

The Mobile IP working group of the Internet Engineering Task Force (IETF) is also working on an architecture based on controlled unicast packet re-direction and tunneling between a mobile host's notional "home router" (i.e., a router one hop away from the host based on the topology implied by the host's IP address), and a router near the host's actual location. See Request for Comment (RFC) 2002. Protocol extensions are required for each mobile host, the home router, and base stations associated with subnets that may be temporarily used as attachment points by the mobile host. RFC 2002, and other RFCs noted herein, may be obtained via the Internet at www.ietf.org/rfc.html.

Mobility can be supported in a way that does not impact on IP level routing. Layer 2 (data link layer) mobility can leave the IP routing topology intact, even when a mobile host moves within a region covered by a given layer 2 technology. For example, a wireless LAN is geographically unconstrained (to a first approximation). A host using wireless connectivity between itself and a local IP router will always appear connected at the same point in the IP topology, as long as wireless connectivity is maintained. An ATM-attached classical IP/ATM (See RFC 2225) host can disconnect from one ATM interface, move to another, re-register with its logical IP subnet, and continue to use the subnet's default router. Even though the host's ATM address has changed, no topology change occurs at the IP level. The only requirement is that the host be logically connected to the same IP router while moving, and this is managed by the IP-to-layer 2 protocol that is being used within the subnet.

The scope of a layer 2 network is not always large enough to cover a desired range of mobility, however. As it moves about, the mobile host may need to switch from one layer 2 network to another. Alternatively, the layer 2 network may be of such large scope as to lead to inefficient (e.g., long latency) paths being used when alternative, shorter paths could be established if the host's home router could be changed dynamically from one router to another in the overall IP topology.

SUMMARY OF THE INVENTION

According to the invention, a method of supporting a mobile host on an information network, includes defining a subnet of the network that includes one or more mobile hosts and a first interface of a home router in the network, identifying the first interface and the mobile hosts with corresponding unicast network addresses, and identifying a second interface of the home router with a corresponding unicast network address. The first interface of the home router and the mobile hosts are assigned corresponding group addresses according to a given relation with respect to the unicast network addresses. Unicast addresses of packets received at the second interface and destined to members of the subnet, are mapped to the group addresses assigned to the members of the subnet.

The mobile hosts link with the network at corresponding points of attachment, and each host sends a request to join a group corresponding to the group address assigned to the host whenever the host links with the network at a new point of attachment. Accordingly, routers in the network are able to track the host as it moves its link with the network from one point of attachment to another. Unicast packets originating from a host outside the subnet and destined to a given mobile host, are routed to the mobile host by way of the virtual link created between the home router and the mobile host.

For a better understanding of the invention, reference is made to the following description taken in conjunction with the accompanying drawing and the appended claims.

DETAILED DESCRIPTION OF THE INVENTION

In the scheme of the present invention, a mobile host's IP address will serve always as a means for uniquely identifying the host, even after the host changes its point of attachment within an overall IP topology. As discussed below, IP level routing protocols may accommodate a host that is actually located on the IP topology at a point different from that which may be indicated by the host's IP address, i.e., the host's IP address may not alone always reflect totally accurate topological guidance for the network's routers. In addition, packets originating from the mobile host will indicate that they originate from the host's unique IP address. These features are obtained in the present scheme by incorporating, inter alia, protocols developed for IP multicast service.

The IP multicast service is an "any-to-many" model, wherein any host can transmit a packet to a multicast group destination address (a class "D" address in IPv4), and have the packet delivered to all hosts who are current members of the designated group. The group may include any number of member hosts, or none at all, and a host does not have to be a group member in order to send packets to the group. Nor does the host need to know how many group members are in existence at any one time, or the location of the group's members across the IP topology. Hosts may join or leave groups at any time. As a member of a group, the network adds the host to a forwarding-distribution tree for packets that are destined to the particular group. See generally, L. L. Peterson, et al., Computer Networks—A Systems Approach, at pages 340-350, Morgan Kaufmann (2d ed. 2000), and P. Loshin, TCP/IP Clearly Explained, at pages 233-245, Morgan Kaufmann (3d ed. 1999), all relevant portions of which are incorporated by reference. To implement the present mobility scheme, it is assumed that the underlying IP network supports multicast service.

Figure 1:
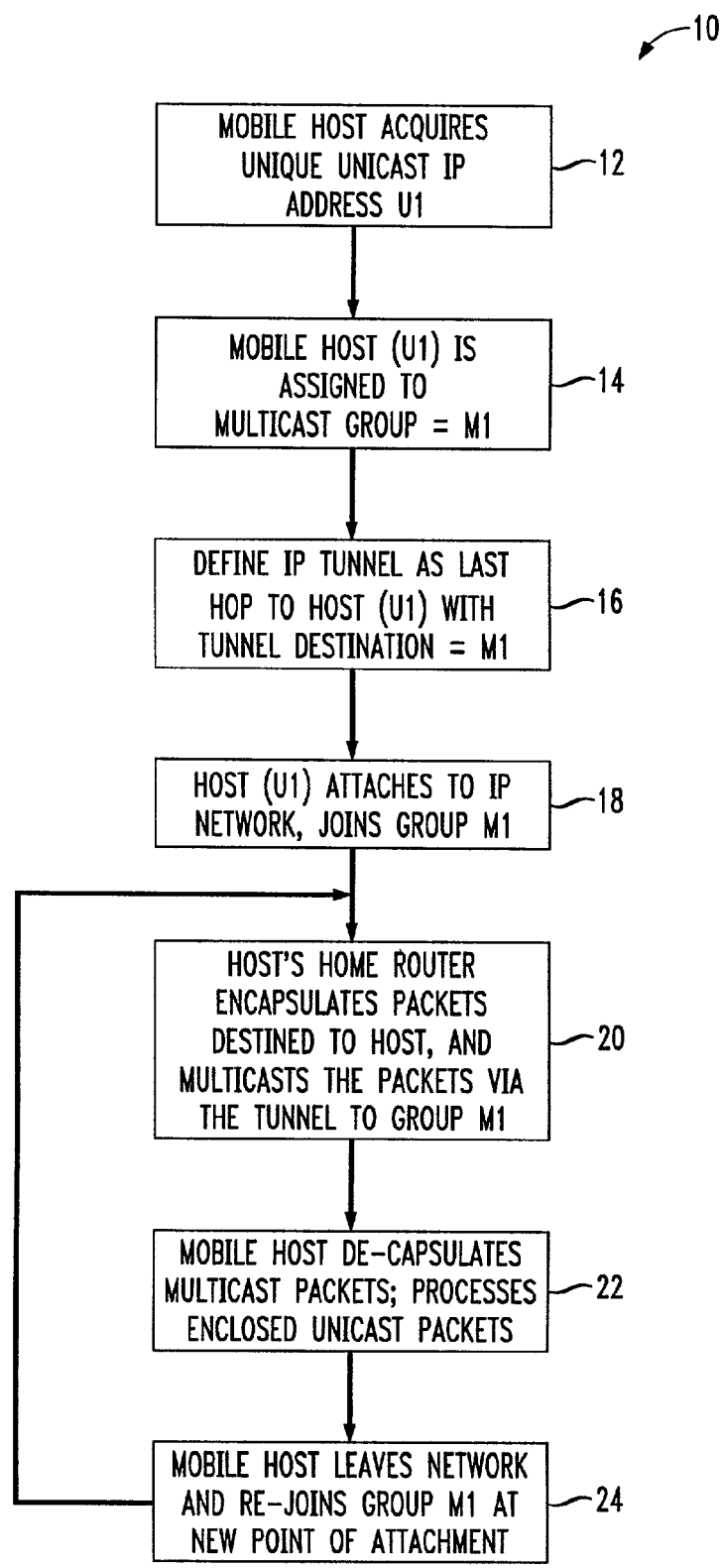
FIG. 1 is a flow chart of certain steps involved in carrying out the present method.

In FIG. 1, the present mobility scheme 10 is outlined as follows:

A mobile host retains a typical unicast IP address, designated, e.g., U1, which is uniquely associated with the host (step 12)

The mobile host is also assigned to a multicast group, e.g., M1, wherein M1 is related to U1 in a known manner (step 14)

The last hop to address U1 is an IP tunnel (a virtual link)

The tunnel destination is the mobile host's multicast group address M1 (step 16)

The mobile host joins group M1 on the layer 2 network to which the host is currently connected (step 18)

At some point in the unicast routing path toward U1, a router (the "home" router) is reached where the IP next hop points to the IP tunneled virtual link interface—packets to U1 are encapsulated at this point, and sent to the multicast group M1 (step 20)

The multicast packets are received by the mobile host (modulo-normal packet loss events) and de-capsulated. The enclosed unicast IP packet is then processed as though received over a regular layer 2 interface (step 22)

When the mobile host moves, it rejoins group M1 at the hosts's new point of attachment. Following established multicast protocols, the underlying Internet assumes that a new member of group M1 has appeared at a new place, and that an old group member at the host's previous point of attachment has disappeared (step 24)

Accordingly, a virtual link layer is created wherein endpoints of the virtual link are identified by IP multicast group addresses. This allows the endpoint interfaces on the virtual link layer to be located anywhere on the IP network, and to move without requiring a change in the address used to reach them. Each time a mobile host attaches (or re-attaches) to the underlying IP network, the network will implement corresponding changes in the forwarding tree for the multicast group to which the host has been assigned.

A virtual link may have multiple endpoints (emulating, e.g., a shared Ethernet), but at a minimum the link will have two endpoints, namely, the mobile host and its local (home) router. The home router's interface to the virtual link will also have its own multicast group address, e.g., M2, which is associated with the router's unique unicast IP address, e.g., U2. An entire subnet of mobile hosts thus can be layered on this virtual link, wherein each host has a multicast address Mx associated with its unique unicast address Ux. All of the unicast addresses Ux are related by a common subnet mask as in regular IP subnets.

Details with respect to (i) assigning group address Mx in relation to the host's unicast address Ux, (ii) ensuring that a mobile host is continuously joined to a group Mx as the host moves, and (iii) representing the virtual link (and the implied, associated IP subnet) in the IP network's routing tables, are set out below.

The Multicast-Tunnel Virtual Link

A layer 2 link provides hop-by-hop connectivity from the perspective of the IP layer. There are two primary roles of a link driver, viz.:

Encapsulate the IP packet in the link layer's native format for transmission, or de-encapsulate the packet from the link layer's native format on reception Map IP next hop addresses to link level addresses (typically performed by algorithmic conversion, a configured lookup table, or an Address Resolution Protocol—ARP)

The IETF's Mobile IP working group defines basic IP-in-IP tunneling for IPV4 in RFC 2003. The IP Next Generation (IPng) working group defines a similar mechanism for IPv6-in-IPv6 tunneling in RFC 2473, and even creates IPV6 subnets on top of an existing IPV4 network by tunneling IPV6 packets inside of IPv4 packets. See RFC 2529. All relevant portions of the three mentioned RFCs are incorporated by reference.

An experimental Multicast Backbone (Mbone) was built as a backbone running over IPV4 unicast tunnels between the few multicast capable routers scattered about the Internet. In each case, one layer of IP topology sees a "virtual link" made from another IP path. The end points of the link (tunnel) are typically defined by two unicast IP addresses taken from the address space of the underlying IP network (which may, or may not, be the same space as the overlain IP network). In the case of the Mbone, these addresses are usually administratively configured. In the IPV6 over IPV4 proposal of RFC 2529, a "link-local" part of each IPV6 address is formed from the underlying interface's IPV4 address.

In the present scheme, tunneling encapsulation is used according to, for example, RFC 2003; however, the destination address of the encapsulating packet is a Group D multicast address (M). Several possibilities for deriving M from the destination address U of the encapsulated IP packet, are described later below.

A Multi-Host, Distributed Next Hop

A multicast-tunnel virtual interface is defined having two components to its "link layer" identity, namely, multicast group M on which it receives traffic, and a location-specific IP address L that represents the interface when transmitting packets. The address L is whatever subnet-specific IP address is temporarily assigned to the mobile host (or node) by the local (real) IP subnet to which the host is currently attached. This address is placed in a source address field of an encapsulating header for outbound packets from the host, and the packet is forwarded as though it originates from the mobile host's current location since multicast routing across the underlying IP network typically performs a reverse path check at each hop. Unless a received packet has M as its destination IP address, and a protocol field indicating multicast-tunnel encapsulation, it is passed off to other link drivers in the mobile host, or dropped.

A router treats the interface onto a multicast-tunnel virtual link as would a host, i.e., the link represents a shared media associated with a particular IP subnet and mask. The home router then advertises this subnet to its peers as though it were a regular, fixed-locale subnet.

Figure 2:
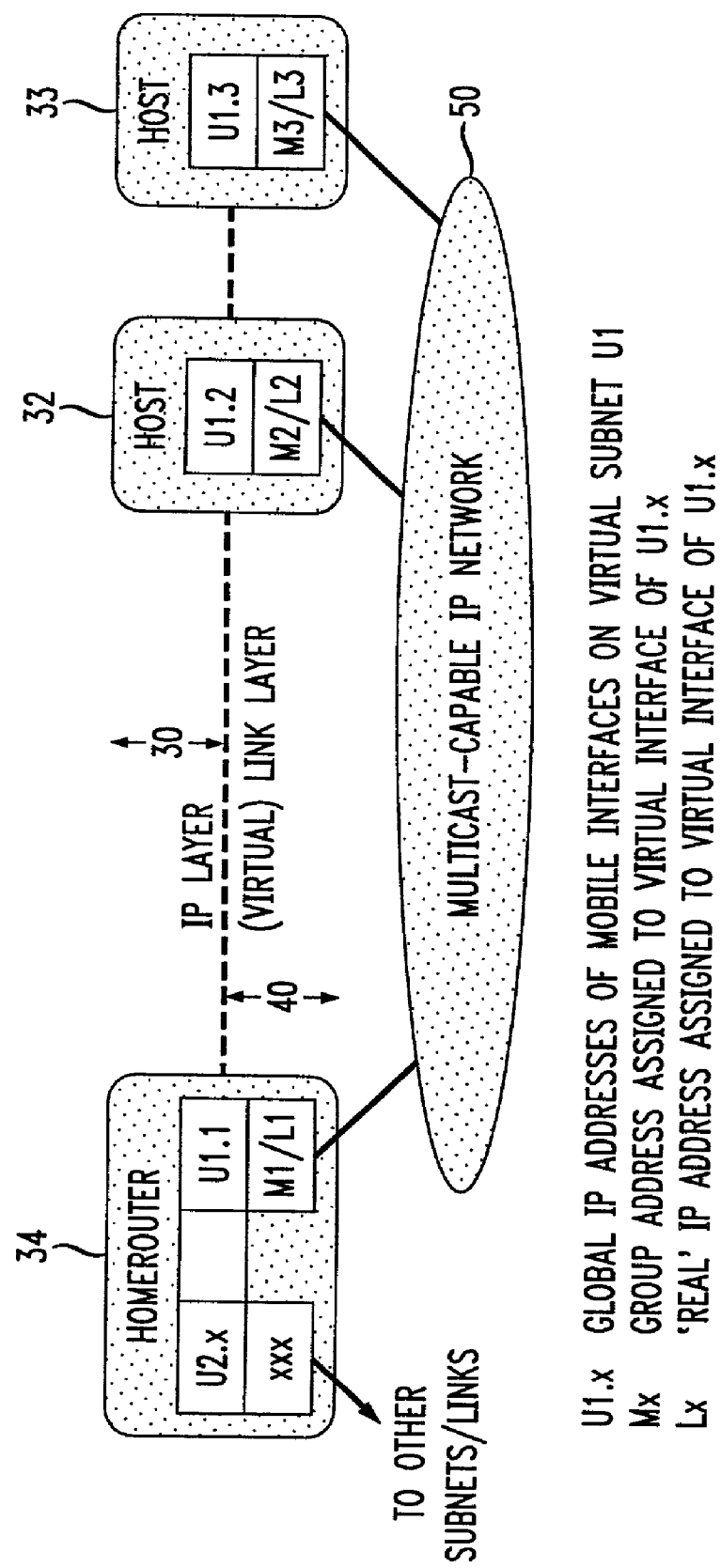
FIG. 2 is a schematic representation of two mobile hosts that are attached to an underlying information network via a home router on the network.

FIG. 2 shows a simple IP subnet 30 built on top of a multicast-tunnel virtual link 40. An underlying IP network 50 has multicast routing capability per existing IP multicast protocols. Mobile hosts 32 and 33 are assigned globally unique IP addresses of the form UI.x (an IP subnet, wherein UI represents the net/subnet, and x represents the individual host). Multicast group addresses are global with respect to the underlying IP network 50, and in this case a small number of them are assigned to interfaces "attached" to the virtual link 40.

For example, address M1 is the address of an interface U1.1 between a home router 34, and the distributed subnet of the mobile hosts 32, 33, with which the router 34 is associated. Likewise, M2 is the address for interface U1.2 of the mobile host 32, and M3 is the address for interface U1.3 of mobile host 33. Each interface also has a location-specific "local" IP address, namely, L1 for the home router 34, and L2 and L3 for the hosts 32 and 33. The home router 34, and the mobile hosts 32, 33, are each linked with an associated multicast capable router (not shown) within the IP network 50. In the present embodiment, the links between mobile hosts and the IP network may be established either by direct connections (e.g., DSL modem), or by wireless communication with base stations that are linked with the Internet.

The home router 34 forwards all packets addressed to members of subnet U1 onto the M1/L1 virtual link interface. At this point, the packets' destination address U1.x is mapped to a given, associated Mx group address, and the packet is encapsulated and transmitted. Mobile hosts wishing to send packets will likewise have local forwarding table entries showing U1.1 (home router 34's interface) as the next hop for all packets destined to IP addresses outside the U1 subnet. These packets are encapsulated by the mobile hosts and addressed to M1, wherein the address M1 is derived from knowledge that U1.1 is the IP level next hop.

Host-to-host communication within the U1 subnet occurs in a similar way, i.e., the target U1.x is mapped to a group address Mx, the packet is encapsulated and then transmitted to Mx through the network 50, without passing through the subnet's home router 34. In each case, a sending host's source address appears in the encapsulating packet header as Lx, which is a local unicast IP address assigned to the sending host's interface at its point of attachment to the network 50. The source address Lx is ignored by the destination interface driver.

In sum, packets originating from hosts outside the subnet U1 can use the unicast, global IP addresses U1.x of mobile hosts on the subnet to route the packets for delivery to the mobile hosts. Conversion of the mobile hosts' unicast addresses occurs at the home router 34, i.e., the last router on the "real" IP path toward the subnet U1. Router 34 knows that U1 represents a virtual subnet, and the router includes such a device driver as to perform the appropriate tunneling encapsulation/decapsulation. The home router 34 also creates the group address Mx based on the target U1.x for any given last hop host "x" in the subnet. The outer (encapsulating) IP header destination address is set to the derived Mx, while the inner (original) IP header still contains the destination address U1.x. The reverse process occurs when a mobile host replies to the outside host, i.e., the mobile host's own forwarding table indicates the next hop toward the outside host is through the interface U1.1 of the home router 34. Device drivers in the mobile host recognize that tunneling is required for the mobile host's reply packets. The multicast address M1 of the home router's interface on the subnet is derived from knowledge of the interface's IP address U1.1, and the mobile host's packets are encapsulated and addressed to M1.

Encapsulation

Figure 3:
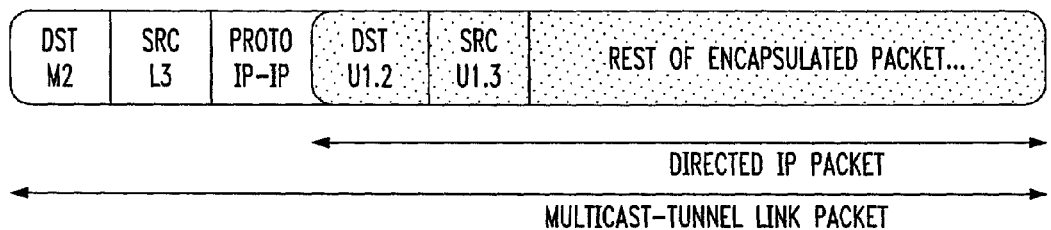
FIG. 3 is a representation of an information packet originating from one of the mobile hosts in FIG. 2 which packet is destined to the other mobile host.

Encapsulation is based on the mentioned RFC 2003. The packet to be encapsulated is placed in the payload of another (encapsulating) IP packet, and the protocol field of the encapsulating packet is set, for example, to 0x0004 to indicate the payload is another IP packet. FIG. 3 shows an example (based on the network in FIG. 2) where a packet is sent from mobile host 33 (global IP address U1.3) to mobile host 32 (global IP address U1.2). The IP based applications see only addresses in the U1.x subnet, and the directed IP packet is formatted normally. Host 33 then derives M2 as the target multicast group associated with host 32, and builds an appropriate encapsulating header. The header includes L3, the locally assigned unicast address of the host 33, as the source (SRC).

Figure 4:
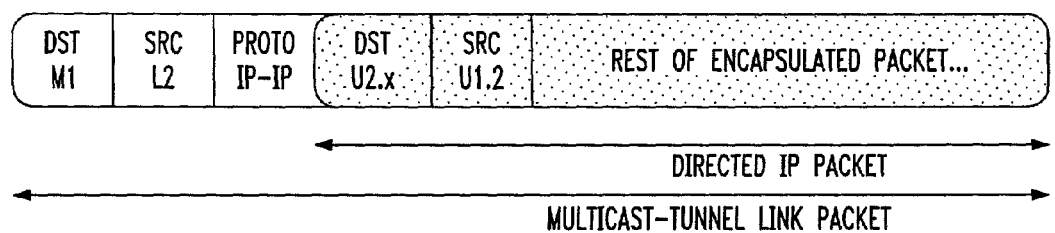
FIG. 4 is a representation of an information packet originating from one of the mobile hosts in FIG. 2, which packet is destined to a host outside of a subnet defined by the two mobile hosts in FIG. 2.

A slightly different scenario is shown in FIG. 4. In this case, mobile host 32 (global IP address U1.2) transmits a packet for an arbitrary node in a different, outside subnet U2.x. Normal IP routing tells the host 32 that it must send the packet via its home router 34. Thus, the IP next hop is U1.1, which IP address is then used by the host to derive M1 as the multicast target for the encapsulated packet. The encapsulating source address is set to L2, the local unicast address of host 32. The multicast-tunnel virtual link interface of the home router 34 extracts the directed IP packet, and forwards it based on the decapsulated destination address U2.x.

In all cases, the source address field in the encapsulating header is ignored upon receipt. The encapsulating header is discarded, just as a conventional interface driver discards regular layer 2 encapsulation. In the example of FIG. 4, the packet forwarded toward U2.x (DST) shows U1.2 as the source (SRC). Thus, the only nodes having knowledge of the mobile host's actual location are its peers on the subnet who see the L values whenever they communicate directly with one another.

The effective maximum transmission unit (MTU) of the tunnel may not be entirely simple to define. If a goal is to avoid fragmentation of the encapsulating packet, one must know the smallest MTU along the path and then set the tunnel's effective MTU to be 20 bytes smaller (i.e., the size of the encapsulating header). As a mobile host moves, however, the path changes so that the size of the smallest MTU might possibly change as well. If the MTU becomes smaller than previously assumed, the encapsulating packet will become fragmented before it reaches the destination mobile host. If the MTU becomes larger, then packets flowing through the tunnel may be smaller than necessary. Therefore, it may be useful to employ a scheme for dynamically re-setting the effective MTU on the multicast-tunnel virtual subnet, accordingly.

Address Assignment and Resolution

For a mobile host to be contacted by its on-subnet peers, two problems must be solved. First, generating an initial local multicast group address for the host, and, second, enabling its peers to identify the multicast group address M based only on knowledge of the mobile host's subnet address U. The first problem is one of address assignment, and the second concerns address resolution.

Although each host and router on the subnet can be manually configured with mappings, such an approach is untenable as being long term. Either an algorithmic solution, or an on-demand assignment and/or resolution scheme, would be more appropriate. All schemes must accept that Class D addresses are quite scarce relative to unicast IPV4 addresses, so that the assignment method should minimize address space consumption.

In either case, two solution spaces exist, namely, one-to-one mappings, and many-to-one mappings. A one-to-one mapping ensures there is a unique M for every unique U. A many-to-one mapping allows multiple unique values of U to map to a single M. For example, the current approach for mapping IPV4 multicast addresses into Ethernet multicast MAC addresses, represents an algorithmic many-to-one mapping. A side-effect of many-to-one mapping is that each group M may end up with multiple registered group members. Hosts whose unicast addresses map to the same group M will all receive packets destined to each other, and must therefore filter them out at the IP layer by comparing the destination address of the encapsulated packet with their own local interface address.

The above replication effect may have undesirable consequences if mobile hosts mapping to the same group M are diversely attached to the underlying IP network. For example, consider four hosts all mapping to the same M; three of the hosts are on different LANs, and one of them is attached via a slow ISDN line. Thus, traffic destined to any of the LAN-attached hosts will also create multicast forwarding traffic to the ISDN-attached host, and the ISDN link may become swamped. Security considerations may also exist, e.g., it may not be desirable for anyone but the target host to receive certain packets. Since no subnet along an end-to-end path is ever guaranteed to be secure in any event, a security conscious mobile host may elect to implement end-to-end IP security if necessary. Many-to-one mappings must be used with caution, and only when potential traffic congestion and security issues are considered tolerable. An algorithmic approach and some dynamic solutions, are discussed below.

Algorithmic Mapping

The term "algorithmic mapping" is used to indicate a known mathematical relationship between M and U. That is, given U; M can be derived locally. A one-to-one mapping also allows U to be uniquely derived if M is known.

A simple one-to-one mapping would map the host field of the unicast destination address into the lower bits of a Class D address. The upper bits of the Class D address are then chosen to keep the groups within a range known to be available for use. The number of lower bits available for arbitrary mapping defines the size of the subnet. The number of groups active at any one time is defined by the number of hosts active on the subnet. If a host is not active, the associated group should have no members. For example:

Assume the multicast range 239.10.0.0 to 239.10.0.127 is available. Assume the mobile unicast subnet is 192.20.35.0/25 e.g., routing prefix is 0xFFFFFF80, thus, host part is obtained by masking with 0x0000007F If U=192.20.35.X, then M=239.10.0.X e.g., M=239.10.0.Y, where Y=(U & 0x0000007F)

Every host U registers as a member of group M derived as above

Alternative one-to-one mappings may also be trivially constructed, with different relationships between the distribution of the unicast addresses Ux and the multicast addresses Mx.

A many-to-one mapping can be achieved by using a more restrictive virtual subnet mask on the unicast address to derive the multicast group M. Thus, multiple unique unicast addresses will generate the same multicast group M. For example:

Assume that the multicast range 239.10.0.0 to 239.10.0.31 is available

Assume the mobile unicast subnet is 192.20.35.0/25, as above

Apply a mask of 0x0000007F, instead of 0x0000007F, to derive the pseudo-host part in the range 0 to 31

If U=192.20.35.X, then M=239.10.0.Y, where y=(X mod 32)

e.g., M=239.10.0.Y where y=(U & 0x0000001F)

Every host U registers as a member of group M derived as above

In this example, 192.20.35.5; 192.20.35.37; 192.30.35.69; and 192.30.35.101 will all join group 239.10.0.5 when they are active, and each of them will receive packets destined for any one of them.

Server Lookup

For certain applications, it may be reasonable for an organization to list the multicast addresses in the Domain Name Server (DNS), together with associated mobile hosts' global unicast IP addresses. This would require either that the IP and the application layers be aware of a special mobility issue, or that the link driver issue DNS queries and cache the mappings it gets in return. Such an approach would not address the initial assignments of mobile hosts to groups, however.

As an alternative, mobile hosts may each be required to register for a well-known "subnet broadcast" group, and then run a version of Ethernet ARP on that group. But this approach also would not deal with the initial assignments of hosts to groups. Server approaches thus do not always solve the local host's initial problem of deriving its M, given knowledge of U (or, conversely, of deriving U with knowledge of M).

Multicast Scoping

Multicast scoping is the operation of limiting the distance over which packets may travel for a particular multicast group. The scope in place for the group addresses used for the multicast-tunnel virtual subnet, defines the range over which the mobile hosts may roam. While this limits overall mobility, it also offers a solution to sharing of the multicast address space between different, distantly located virtual subnets.

Using the previous example, if groups in the range of 239.10.0.0 to 239.10.0.127 are always scoped to stay within a particular country's part of the Internet, then intra-country virtual subnets in, e.g., Australia, Germany, and the UK could all utilize these groups without fear of interference. Although this limits the ability of a mobile host to move seamlessly between countries, there are likely a large number of applications in which such a limitation is quite acceptable. Similar arguments apply to multicast groups scoped to remain within company intranets. For example, hundreds of intra-company mobility applications could be supported by re-using the same multicast group space for each company.

The relationship between IP multicast group scoping and actual geographical scope, depends on the layer 2 technologies in use within the allowed IP scope. For example, multicast groups scoped to remain within a corporate intranet might still have countrywide or global scope, if the intranet utilizes appropriate cellular or satellite wireless technology at layer 2. Other corporate intranets may cover the same geographical area without interference, because their IP level topologies remain logically distinct.

Moving Around the Internet

The scheme of the present invention enables a mobile host to join its assigned multicast group M, notwithstanding the point of attachment of the host to the Internet. If the host moves to a new attachment point, it immediately re-issues a join request for group M. Given the basic IP multicast service model, the network will itself assume there is a new member for group M, and new branches of M will be defined by the network to the new attachment point. The new branch (or branches) will ensure that the mobile host continues to receive packets that are destined to it via the multicast-tunnel virtual link layer. If the mobile host retains some connectivity with its prior point of attachment, the host may proactively de-register the prior branch from M. Alternatively, the host may simply allow the prior branch to be torn down by operation of layer 3 (network layer) time-outs, or in response to layer 2 indications that the host has discontinued its prior point of attachment.

IGMP Activity

The mobile host registers with multicast group M by transmitting an IGMP Group Membership Report (join) message on the local (real) subnet to which the mobile host is currently attached. The required functionality is supported, for example, in IGMPv1 (see RFC 1112), and in IGMPv2 (see RFC 2236). All relevant portions of both RFC's are incorporated by reference. To remain registered with multicast group M, the mobile host must respond affirmatively to IGMP Group Queries issued by any router on the local (real) subnet to which the host is attached, as per IGMPv1 or IGMPv2 rules.

IGMPv2 also supports an explicit IGMP Leave message that can be used to expedite the pruning of a branch that is no longer required, for example, when the host moves to a new attachment point in another subnet. This is only useful when the mobile host has some way of knowing a priori that it is about to leave the local subnet, or that it may still inject an IGMP Leave message into its most recent local subnet after the host establishes an attachment to a new local subnet.

To avoid forged join and leave messages originating from outside a subnet, IGMPv2 suggests that routers verify the source IP address as one belonging to the local subnet. Therefore, before a mobile host joins group M under the present scheme, the host preferably should establish a valid source address L assigned from an address pool belonging to the local (real) subnet to which the host is attached. It may be desirable that a mobile host implement IGMPv2 and utilize compatibility rules in RFC 2236, when the host attaches to a real subnet in which the local router is still speaking according to IGMPv1. When standardized, IGMPv3 may also be used.

Establishing Local Attachment Points

Mobile hosts may have one or more layer 2 technologies that they can use for attachment to the wider Internet. These are considered "real" link interfaces. The "real" IP interface layered over each link interface supports the multicast-tunnel virtual link interface. As described above, the mobile host requires a legitimate IP address L that is part of the subnet to which it is temporarily attached. The actual value of L, and its method of assignment, is not of general concern. The following three requirements do apply for mobile hosts, however:
  The layer 2 link interface must be able to auto-configure itself as a legitimate member of the layer 2 network to which the mobile host is attached
  The layer 2 network must support connectivity to at least one IP router
  Appropriate auto-configuration protocols must exist enabling the mobile host to establish its new local IP address, subnet mask, and the identity of at least one router on the subnet A simple example is a dial-in point-to-point protocol (PPP) link. PPP supports negotiation between the client and a dial-in server to determine a server-assigned IP address for the mobile client. A mobile host in the form of a laptop PC may use a DSL modem to dial through and connect with a server on a public switched telephone network (PSTN), wherein the server is also connected to the underlying IP network 50. Another example, using IPV6 protocol, would be the generation of an IPv6 link-local address from an Ethernet MAC associated with the host's Ethernet NIC, which would then allow an IP level auto-configuration of a link-specific global IPV6 address for the host.

Once the mobile host's local IP address is established, it can issue an IGMP Group Membership Report for M, and activate the multicast-tunnel virtual interface. Assuming the local subnet is multicast-capable, the mobile host is now re-attached and back "on the air".

It is also possible for the mobile host to engage in direct communication with other IP endpoints (i.e., not over the multicast-tunnel virtual subnet). These connections will, however, be such as to —
  Originate from the host's local IP address L, not its global IP address U
  Be transient, since the connections will be disrupted as soon as the host moves to a new attachment point on the IP topology and assumes a new address L Therefore, it is preferred that a mobile host not engage in IP communication using its local (transient) identity L, except for purposes of (i) establishing its membership in group M, (ii) sending tunneled traffic within the virtual subnet, and (iii) receiving non-tunneled multicast traffic as described below.

Quality of Service

Guaranteeing quality of service (QoS) across a multicast-tunnel virtual subnet is non-trivial, given that the subnet encompasses a potentially diverse and changing set of real IP networks. Intra-virtual subnet QoS between mobile hosts U1.x and U1.y requires establishing QoS guarantees between a source Lx and a destination group My, across the intervening IP networks.

While one approach would be not to provide any guarantee and hope to emulate a best-effort Ethernet-like subnet, the QoS might actually fall below Ethernet standards. On an Ethernet, good QoS is achieved when the number of sources is low, or when they share a common link in a synchronized fashion. On a virtual subnet, however, packet losses and bandwidth constraints may occur even if only one virtual interface is transmitting at any one time.

Another approach would be to treat each virtual subnet as an application running over the wider Internet (which, in a sense, it is), and have each instance of the application issue RSVP PATH messages covering intra-virtual subnet communication. If the application starts to send packets from U1.x to U1.y, the virtual interface driver on U1.x begins sending PATH messages from Lx (its local "real" IP address) toward My (the multicast group corresponding to U1.y). The virtual interface driver on U1.y responds with RESV messages, and the underlying IP paths between Lx and My now have resources reserved. When U1.x stops sending packets to U1.y, its virtual subnet driver eventually stops sending PATH messages to My, and the resources are released. The same process can occur between all source-destination pairs within the virtual subnet, thereby assuring some degree of intra-virtual subnet QoS. The RSVP approach thus requires a resolution of (1) when does a source begin sending PATH messages to multicast groups representing peers on the virtual subnet, (2) how long after packets cease being sent to an on-subnet destination, does the source stop sending the PATH messages, and (3) what kind of resources are requested in the RESV messages.

Mobile Host Multicasting

The present scheme as described so far only addresses the mobility of a host participating in unicast communications with the rest of the Internet, even though the scheme incorporates IP multicast services available within the Internet. Participation in multicast communication with nodes inside and outside of the mobile host's virtual subnet requires additional rules in order to maintain efficient forwarding trees, while ensuring that the mobile host always appears to be sending traffic from its unicast address U. While an apparent solution might call for the virtual subnet to add or to prune itself to or from the forwarding trees for multicast groups, as do regular subnets in response to local IGMP reports from on-subnet hosts, two problems then arise.

First, the virtual link would need to emulate link level multicast in order to tunnel packets to possibly multiple members of any group G within the virtual subnet. If this is done simply by mapping each multicast group address G to some other group Mg for intra-subnet transport, one will quickly run out of multicast addresses, in addition to the fact that unlike the possible values of U, the value of G is rarely known beforehand. Second, the actual forwarding path is likely to be quite inefficient, particularly when a mobile host attaches to a subnet that is far closer to the multicasting source than the host's home router.

An alternative scheme would allow for the mobile host to engage in multicast communication natively using the local (real) subnet to which it is attached. Issuing an IGMP group membership report for group G on the local subnet would ensure that the local subnet is added to the group's forwarding tree at the most efficient branch point. The mobile host would receive packets for group G over its L interface (without encapsulation), in the same way the host receives encapsulated virtual subnet packets for group M. If the mobile host itself were to multicast packets back out again, however, they would be forwarded throughout the Internet as having come from address L, rather than from address U.

Thus, the former solution allows outbound multicast transmissions from the mobile host to appear as though they originate from address U, and the latter solution obviates the need to emulate virtual link layer multicast and ensures the most efficient forwarding path toward the mobile host. The following assumptions may then be made concerning the mobile hosts—

Mobile hosts are more likely to sink multicast traffic than to source multicast traffic A mobile host's local identity should be concealed when it sources traffic A hybrid solution such as described below is therefore preferred.

One-way Encapsulation

The hybrid scheme requires the mobile host's IP layer to implement separate receive side and transmit side processing rules. To receive multicast groups, the mobile host registers its local subnet interface as a group member with an IGMP Group Membership Report on the local subnet. If an upper layer application is interested in group G, the mobile node's virtual interface driver joins group G on the local subnet. Packets may be received for group G through the regular link interface or through the virtual link interface (encapsulated within a packet sent to M). All multicast packets received over the virtual subnet interface must be silently discarded. Multicast packets received over the regular link interface will be processed normally, with one important exception, viz., if the IP source address of the packet matches the mobile host's global address U, the packet is silently discarded. Thus, as far as the home router is concerned, the virtual subnet never has members of any group, and is permanently pruned from all groups. IGMP messages received over intra-virtual subnet tunnels from mobile hosts are ignored, and the home router will not issue IGMP messages over intra-virtual subnet tunnels.

In order to transmit to multicast groups, the mobile host encapsulates all outbound multicast packets, and sends them to the home router. The router's virtual link interface strips off the encapsulating header and processes the inner packet normally, forwarding the packet out all regular interfaces except those currently pruned from group G or the virtual subnet interface on which the encapsulating packet arrived. The overall effect is that all group members of G about the Internet will receive packets originating from the mobile host, and these packets will identify the address U in the source address field.

Figure 5:
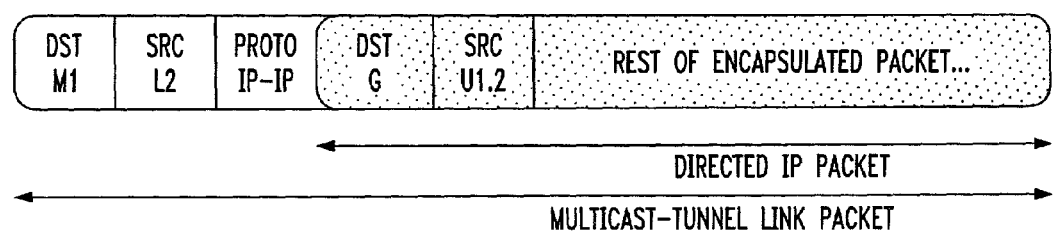
FIG. 5 is a representation of a multicast information packet originating from one of the mobile hosts in FIG. 2.

FIG. 5 shows how mobile host 32 (IP address U1.2) in FIG. 2 would transmit a multicast packet to a particular group G. The home router 34 has interface U1.1 with the virtual subnet, so the encapsulated packet is addressed by the host 32 to group M1. The home router 34 is then responsible for natively forwarding the inner packet along a forwarding tree developed for members of group G. All members of group G about the Internet will receive the packet, and will see that it originates from the host 32 having IP address U1.2. Other members of the virtual subnet who are also members of group G, will then receive the packet as a regular IP packet over their own local link interfaces.

One consequence of the present tunneled transmission scheme is that a mobile host will receive copies of its own outbound multicast packets, if the host is also a member of the targeted group. Hence, the receive rules preferably should specify that a packet is to be discarded silently by a host if the source field matches the host's own IP address U. Another consequence of the scheme is that if the home router 34 shares address M1 with another mobile host (e.g., a many-to-one mapping exists between U and M), the other mobile host will receive the multicast packets over its virtual subnet interface, in addition to receiving the packets over its "real" link interface. Thus, the receive rules for mobile hosts should also specify that any multicast packet received over the virtual subnet interface (i.e., received in an encapsulating packet addressed to M) must be discarded, and that only a router should be allowed to process multicast packets received on a virtual subnet interface.

The foregoing scheme results in optimal traffic routing toward a mobile host as a group member, and ensures correct forwarding of a mobile host's own transmissions to multicast groups. Awareness of a transmitting mobile host's current attachment point L is limited to the home router 34, and to any other host within the virtual subnet that might share the router's multicast group M.

Security

A multicast-tunnel virtual link has fairly limited inherent security, and will therefore depend on advances in secure control of multicast group membership and end-to-end packet level security mechanisms. All mobile schemes are insecure in so far as they are likely to use broadcast wireless mechanisms at some point in the end-to-end path, typically at the last hop to the mobile host. Packets flowing into and out of the mobile host can be passively intercepted, merely by being within wireless range of the mobile host. A multicast-tunnel virtual link adds an extra method by which packets may be passively intercepted, e.g., the interceptor simply issues its own IGMP Group Membership Report for group M, and gets added to the forwarding tree for that group. In theory, the intercepting node may be located anywhere on the Internet.

Vulnerability to having other nodes join group M can be reduced, however, if the underlying IP multicast service implements "authenticated join" operations for groups making up the multicast-tunnel virtual link. The problem is somewhat analogous to the need for physical security on access to a shared Ethernet, but on a larger scale since the authenticated joins must apply over the entire scope of a mobile host's likely movement, and, hence, the topological scope of the multicast-tunnel virtual link.

Restricting access to copies of intra-virtual subnet traffic becomes less important if each packet's contents are encrypted. The mobile host itself might choose to implement end-to-end encryption above the virtual link layer, thereby covering all IP hops between itself and other secure participants. This would not require any special behavior from the virtual link layer interfaces on the mobile host or the home router. The security associations thus should use the mobile host's permanent unicast identity U, rather than the host's transient unicast identity L.

Securing the virtual link itself might be achieved by encrypting the intra-virtual subnet tunnels. This would require extensions to the home router as well as to the mobile hosts, and would not guarantee the privacy of the IP packets once they left the virtual link. In any event, any host seriously concerned about privacy should preferably implement end-to-end encryption.

Even without a requirement for secrecy, there may be a requirement to verify that a packet has not been forged or tampered with. Again, a suitably concerned mobile host may implement end-to-end authentication procedures on the inner IP packet, rather than on the encapsulating packet. The security associations should use the mobile host's permanent unicast identity U rather than the host's transient unicast identity L. Methods of distributing authentication and encryption/decryption keys to every mobile host need not be mobility-specific, since the most logical solution is to deploy end-to-end schemes that treat the virtual link as just another subnet between endpoints.

The present scheme serves to minimize the need to develop additional protocols for mobility, over and above protocols already developed (and under development) to support IP multicast. The scheme calls for the mobile hosts and a home router to implement special multicast, tunnel-based virtual link interfaces, and that existing IP multicast and group management protocols, for example, RFC 1112 and RFC 2236, be supported at those regions of the Internet (or Intranet) where mobile nodes are likely to attach.

The mobile hosts are grouped into virtual subnets layered over an emulated, virtual link layer. Each mobile host is assigned a multicast group address M, representing a virtual link layer address that is associated in a known manner with the mobile host's long-term, unicast identity U. Virtual link layer communication is achieved by IP tunneling to each mobile host's virtual link address M. Because IP multicast service does not require senders to know the members of M, or the members' current locations, mobile hosts may join or rejoin their associated group M wherever they currently attach to an underlying IP network. Movement of a mobile host results in changes to the multicast forwarding tree for the host's group, an action that is transparent to sources transmitting to the moving member of the virtual subnet.

The virtual subnet is logically attached to the wider network through a home router. This router has at least one interface to the virtual link layer, and, hence, to the virtual subnet. All unicast communications with the outside world pass through the home router in each direction. The tunneling scheme ensures that the outside world is only aware of each mobile host's long term address U, and has no knowledge of where on the network the mobile host is currently attached. Mobile hosts may also participate in regular, multicast-based communications with the outside world. A hybrid scheme, disclosed above, allows mobile hosts to transmit multicast traffic using tunnels to the home router, and to receive multicast traffic directly from the source(s) through the underlying IP network, i.e., without tunneling via the home router.

The mobile hosts and associated home router(s) each have a virtual interface driver that encapsulates and de-encapsulates IP packets for multicast tunneling, and ensures that the host is joined to its associated multicast group, assuming the underlying IP network supports host registration at all points where the mobile hosts may attach, per, e.g., IGMPv1 (RFC 1112) or IGMPv2 (RFC 2236). Scaling and performance limitations were described, as well as the use of RSVP to enable intra-subnet QoS, and of end-to-end IP security mechanisms to protect mobile communications.

While the foregoing description represents preferred embodiments of the invention, it will be obvious to those skilled in the art that various changes and modifications may be made without departing from the spirit and scope of the invention which is pointed out by the following claims.

I claim:

1. A method of supporting a mobile host on an information network configured for multicast routing, comprising:
    defining a subnet (U1) of the network that includes one or more mobile hosts and a first interface of a home router in the network, and identifying the first interface and the mobile hosts with corresponding unicast network addresses (U1.x);
    identifying a second interface of the home router with a corresponding unicast network address (U2.x);

assigning the first interface of the home router and the mobile hosts corresponding group addresses (Mx) according to a defined relation with respect to said unicast network addresses;

mapping, at the second interface of the home router, unicast addresses of packets received at the second interface and destined to members of the subnet (U1), to the group addresses (Mx) assigned to the members of the subnet;

linking the mobile hosts with the network at corresponding points of attachment; and sending a request from a given mobile host to join a group corresponding to a group address assigned to the given mobile host each time the mobile host links with the network at a new point of attachment, thereby enabling routers in the network to track the mobile host as it moves its link with the network from one point of attachment to another, and to route unicast packets originating from a host outside the subnet and destined to a given mobile host, by way of a virtual link defined between the home router and the given mobile host.

2. The method of claim 1, including linking a given mobile host with the network by way of a wireless link with a base station that is connected to the network.

3. The method of claim 1, including linking a given mobile host with the network by using a modem that is connected to a public switched telephone network having a server which is linked with the information network.

4. The method of claim 1, including assigning the mobile hosts unique local addresses (Lx) corresponding to the current points of attachment of the mobile hosts with the information network.

5. The method of claim 4, wherein a local address is assigned to a given mobile host by a network router associated the host's current point of attachment with the network.

6. The method of claim 4, including transmitting information packets from a first mobile host on the subnet (U1) to a second mobile host on the subnet, by encapsulating the packets with an outer encapsulating header whose destination address is the group address (Mx) assigned to the second mobile host.

7. The method of claim 6, including placing the local address (Lx) of the first mobile host as the source address in the encapsulating header.

8. The method of claim 7, including placing the unicast address (U1.x) of the second mobile host as the destination address in an inner encapsulated header of the packets, and placing the unicast address (U1.y) of the first mobile host as the source address in the encapsulated header.

9. The method of claim 4, including transmitting information packets from a given mobile host on the subnet (U1) to a host outside the subnet, by encapsulating the packets with an encapsulating header that includes a group address Mx assigned to the first interface of the home router.

10. The method of claim 9, including placing the local address (Lx) of the given mobile host as the source address in the encapsulating header.

11. The method of claim 10, including placing the unicast address (U2.x) of the host outside the subnet as the destination address in an inner encapsulated header of the packets, and placing the unicast address (U1.x) of the given mobile host as the source address in the encapsulated header.

12. The method of claim 1, including transmitting multicast information packets from a given mobile host on the subnet to a group (G) of other hosts on the network, by encapsulating the packets with an outer encapsulating header whose destination address is the group address (M1) assigned to the first interface of the home router.

13. The method of claim 12, including placing the local address (Lx) of the given mobile host as the source address in the encapsulating header.

14. The method of claim 13, including placing the group address (G) of the other hosts as the destination address in an inner encapsulated header of the packets, and placing the unicast address (U1.x) of the given mobile host as the source address in the encapsulated header.

* * * * *

UNITED STATES PATENT AND TRADEMARK OFFICE
CERTIFICATE OF CORRECTION

| | | |
|---|---|---|
| PATENT NO. | : 7,650,424 B2 | Page 1 of 1 |
| APPLICATION NO. | : 09/824960 | |
| DATED | : January 19, 2010 | |
| INVENTOR(S) | : Grenville J. Armitage | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2791 days.

Signed and Sealed this

Twenty-eighth Day of December, 2010

David J. Kappos
*Director of the United States Patent and Trademark Office*